Patented Dec. 14, 1937

2,102,101

UNITED STATES PATENT OFFICE 2,102,101

PROCESS OF PREPARING FAT AND OIL SPLITTING ENZYME FROM PLANT SEEDS

Etsuo Takamiya, Moji, Japan

No Drawing. Application June 27, 1935, Serial No. 28,773. In Japan July 21, 1934

4 Claims. (Cl. 195—66)

This invention relates to a process of preparing fat and oil splitting enzyme, and consists in that the raw material, that is, the ground plant seeds containing fat and oil splitting enzyme or lipase and their unique fats and oils, or their pressed cakes containing over 5% in weight of fats and oils with the addition of a proper increment thereof if necessary, is treated at a temperature below 50° C. with about 0.6 to 1.2 normal solution of inorganic acids such as phosphoric acid, sulphuric acid, hydrochloric acid or nitric acid, or organic acid such as acetic acid, or a mixed solution of any two or more of them, in the proportion of about 40 to 5% of the raw material to form a muddy mass, so that the union of the enzyme with its associated protoplasm is cut off, and the enzyme thus cut off is subsequently extracted and separated by a method know per se.

The object of the invention is to change the enzyme present in the plant seeds from an inactive state to an active enzyme or spermatolipase of free state by cutting off the union of the enzyme with its associated protoplasm, particularly proteins and thereby considerably increasing the yield of the enzyme of comparatively pure state and having powerful activity in a simple and economical manner.

Now, the explanation for changes taking place in the castor-bean seed when subjected to the acid treatment as above mentioned, will be given as follows:

Firstly, according to the study of the inventor, it is found that due to the acid treatment, the proteins contained in the seed are not entirely subjected to hydrolysis, but produce acid-proteins. It is also found that the number of enzyme-units calculated as spermatolipase increases by several times that of the original seed. Here, the enzyme-unit means the one indicated by a curve of enzyme-unit obtained at 30° C. and within 30 minutes in accordance with the method proposed by Mr. R. Willstätter, that is the active power of the enzyme for splitting fats and oils at a rate of about 6%. From the facts just mentioned it can be assumed that the enzyme, the greater part of which has been present in the seed associated with proteins and in an inactive state (zymogen), is now converted to an active enzyme or spermatolipase of free state, while the proteins are combined with the acid to produce acid-proteins.

A few examples of carrying out the invention are explained as follows:

Example 1.—To 100 gms. of ground castor-bean seeds (the number of enzyme-units is 2200 and the enzyme-value, that is, the number of enzyme-units found in 0.01 gr. of the raw material according to the method proposed by Mr. R. Willstätter, is 0.22), is added about 20 c. c. of 1 normal solution of phosphoric acid, and the whole is mixed well at 30° C. for 30 minutes. Then the mixture is filtered under pressure, the filtrate is subjected to the centrifugal separation, and thereby the turbid fat-like enzyme agent is obtained.

Now, this fat-like enzyme agent is added to olive oil as substrate in the proportion of 5% and a test is carried out at about 30° C. employing acetic-acetate solution as a buffer solution (hydrogen iron concentration of which is 4.7). Here it is found that 72% of the fat is split in about 30 minutes. Therefore, one can know that the number of enzyme-units of this agent as calculated from the said curve of enzyme-unit is 7600. Consequently, the yield of the active enzyme is about 3.5 times that of the original seed, and the enzyme-value, which amounts to 12, is about 55 times that of the original seed.

In order to compare this result with that of the known method, a test is made on a pressed cake obtained from ground castor-bean seeds, subjected to ether extraction so that it contains less than 1% of fats and oils. 59 grs. of this cake (the number of enzyme-units is 2300) are treated with acid solution in quite the same manner as in the Example 1, and 100 c. c. of olive oil is added to prepare a fat-like enzyme agent. The same test as in the preceding description is made on this enzyme agent to obtain the number of enzyme-units, and it was found that the number decreased considerably down to 300.

Example 2.—100 grs. of ground castor-bean seeds (the number of enzyme-units is 2200), are treated with about 25 c. c. of .06 normal solution of sulphuric acid, in quite the same manner as in the Example 1, and a fat-like enzyme agent is obtained.

This enzyme agent is added in the amount of 3% to olive oil as substrate, and a test is carried out in the same manner as in the Example 1. Here it was found out that 25.2% of the fat is split so that this enzyme agent has a number of enzyme-units amounting to 5320, which shows that the yield of the enzyme is about 2.4 times that of the original seed.

Example 3.—100 grs. of ground castor-bean seeds (the number of enzyme-units is 2200) are treated with about 20 c. c. of 0.8 normal sulphuric acid solution in the same manner as in the Example 1, thereby obtaining a fat-like enzyme agent.

This enzyme agent is added in the amount of 1% to olive oil as substrate, and a test is carried out in the same manner as in the Example 1. Here it is found out that 11% of the fat is split up. From this test, one can know that the number of enzyme-units of this enzyme agent is 6840, indicating the fact that the yield of the enzyme is about 3.1 times that of the original seed.

*Example 4.*—100 grs. of ground castor-bean seeds (the number of enzyme-units is 2200) are treated with about 15 c. c. of 1.2 normal hydrochloric acid solution in the same manner as in Example 1 and a fat-like enzyme agent is obtained.

This enzyme agent is added in the proportion of 2% to olive oil as substrate, a test is carried out in the same manner as in Example 1, and it was found out that 19.2% of the fat is split up. From this result, one can know that the number of enzyme-units of the enzyme agent is 6080, showing the fact that the yield of the enzyme is about 2.8 times that of the original seed.

The following examples illustrate cases in which the raw material contains less quantity of fats and oils than that of the original seed, but above 5%.

*Example 5.*—100 grs. of pressed cake of castor-bean seeds containing about 40% of fat (the number of enzyme-units is 2200) are treated with about 23 c. c. of 0.9 normal solution of sulphuric acid in the same manner as in Example 1, and then 50 c. c. of olive oil is added to obtain a fat-like enzyme agent. This agent is added in the amount of 3% to olive oil as substrate, a test similar to that described in Example 1 is carried out, and it was found out that 15% of the fat is split. This shows that the number of enzyme-units is 6640, and that the yield of the enzyme is about 3.0 times that of the original seed.

*Example 6.*—100 grs. of cake of castor-bean seeds containing about 20% of fat (the number of enzyme-units is 3200), are treated with about 25 c. c. of 0.8 normal sulphuric acid solution, in the same manner as in Example 1, and then 50 c. c. of olive oil is added to obtain a fat-like enzyme agent. This agent is added in the amount of 2% to olive oil as substrate, and a test is carried out in the same manner as in Example 1 and it was found out that 14.4% of the fat is split up. The number of enzyme-units is, therefore, 7200, showing that the yield of the enzyme is about 2.3 times that of the original seed.

*Example 7.*—100 grs. of cake of castor-bean seeds, containing about 5% of fat (the number of enzyme-units is 3600) are treated with about 27 c. c. of 0.6 normal solution of sulphuric acid in the same manner as in Example 1, and then 50 c. c. of olive oil is added to prepare a fat-like enzyme agent. This agent is added in the amount of 2% to olive oil as substrate, and a test is effected in the same manner as in Example 1, and it was found out that 11.5% of the fat is split up. This shows that the number of enzyme-units is 4320, from which one can know that the yield of the enzyme is about 1.2 times that of the original seed.

From the above mentioned examples and other similar experiments done by the inventor, it has been decided that the presence of at least 5% of fats and oils is of the most importance.

The hulled castor-bean seed usually contains about 67% of fats and oils. Therefore, in case of using fat and oil free cake of the same, the content of fats and oils of the same can be made approximately equal to that of the hulled seed by adding thereto two times of the fats and oils obtained from the original seeds.

When a raw material containing comparatively large quantity of fats and oils is used, it is preferable that a correspondingly large amount of the acid is used as well as an acid solution of a high concentration, but within the range as already mentioned. The reverse is true when a raw material containing comparatively small quantity of fats and oils is used. These facts can be seen from the above Examples 5 to 7.

Among the above mentioned acids, phosphoric acid, sulphuric acid, hydrochloric acid and acetic acid are approximately equivalent in their actions, and nitric acid, although less active, can also be used satisfactorily.

The reason why, according to the invention, the concentration of the acid solution must be preferably restricted to the range of 0.6 to 1.2 normal, is that in case of using an acid solution of a concentration below the lower limit, the action of the acid is far ineffective, so that the yield of the enzyme is greatly decreased, while in case of using an acid solution of a concentration above the upper limit, the acid affects the enzyme unfavourably and gives disadvantageous results.

According to the invention, it is further necessary that the quantity of the above acid solution is preferably restricted to the range of about 40 to 5% to the raw material. Because, it has been found that when the upper limit is exceeded, the enzyme is not only inclined to be degenerated, but its extraction and separation are not effectively carried out, while if the lower limit is passed, the action of the acid becomes less effective, and also the extraction and separation of the enzyme yield is not good. Thus, in either case the yield of the enzyme becomes very small. Further it has been found that when about 20% of 1 normal solution of acid is applied to the ground castor-bean seeds, the best result is obtainable. The fact that the raw material must contain over 5% of fats and oils, results that acid solution of far greater concentrations and quantities than in the known method can be used in this invention not only causing no disadvantageous results, but also gives better yields. Thus, it will be understood that the said two conditions in regard to the acid solution combined with the presence of over 5% of fats and oils, bring about the excellent result aimed at in the invention.

Various investigations have been made long ago as to the preparation of the enzyme for use in the fat and oil splitting industry. However, the industry according to the enzyme method has not been developed for the reasons that it is more expensive than the industry according to the other method.

However, after experiments during many years, the inventor has discovered the fact that the greater part of lipase in the seed exists in a tightly associated state with its protoplasm and particularly with proteins, and thus in an inactive state (zymogen). According to the invention, this association or union is cut off so that among the enzymes, the class which was in an inactive state, can be set free and modified to an active one (spermatolipase) of free state, that is a lipase having an optimum hydrogen ion concentration or optimum pH=4.7. It results also therefrom that the yield of the enzyme is increased considerably, while the enzyme is obtained in comparatively a pure state.

In hitherto known operations of extracting and separating out the enzyme, one strove to extract and separate the same directly from the seed without cutting off the union by which the enzyme is associated with the proteins, so that the yield of the enzyme was small, and the product was contaminated with a large quantity of proteins. These conditions, in fact, were a bar to an economical, industrial development of the process. Now, according to the invention, not only the yield of enzyme is considerably increased, but also the enzyme is produced in comparatively pure state and with powerful activity. Furthermore, the enzyme is easily and economically prepared. It will thus be seen that according to the invention a very economical industrialization of fat- and oil-splitting process can be realized.

What I claim is:

1. The process of preparing fat and oil splitting enzyme material which comprises, adjusting the oil content of seed material which contain said enzyme to a minimum of 5% of their weight, and subjecting the said oil adjusted material to the action of from 40 to 5% of their weight of a 0.6 to 1.2 normal solution of an acid, and separating the said enzyme material from the resulting mixture of oil and acid.

2. The process of preparing fat and oil splitting enzyme material which comprises, adjusting the oil content of seed material which contain said enzyme to a minimum of 5% of their weight, and subjecting the said oil adjusted material to the action of from 40 to 5% of their weight of a 0.6 to 1.2 normal solution of phosphoric acid, and separating the said enzyme material from the resulting mixture of oil and acid.

3. The process of preparing fat and oil splitting enzyme material which comprises, adjusting the oil content of seed material which contain said enzyme to a minimum of 5% of their weight, and subjecting the said oil adjusted material to the action of from 40 to 5% of their weight of a 0.6 to 1.2 normal solution of sulphuric acid, and separating the said enzyme material from the resulting mixture of oil and acid.

4. The process of preparing fat and oil splitting enzyme material which comprises, adjusting the oil content of seed material which contain said enzyme to a minimum of 5% of their weight, and subjecting the said oil adjusted material to the action of from 40% to 5% of their weight of a 0.6 to 1.2 normal solution of hydrochloric acid, and separating the said enzyme material from the resulting mixture of oil and acid.

ETSUO TAKAMIYA.